United States Patent
Forti (10) Patent No.: US 11,746,812 B2
(45) Date of Patent: Sep. 5, 2023

(54) DUAL COMPONENT SEALING FASTENER AND COUPLING ASSEMBLY INCLUDING SAME

(71) Applicant: Newfrey LLC, New Britain, CT (US)

(72) Inventor: Adam A. Forti, Troy, MI (US)

(73) Assignee: Newfrey LLC, New Britain, CT (US)

( * ) Notice: Subject to any disclaimer, the term of this patent is extended or adjusted under 35 U.S.C. 154(b) by 281 days.

(21) Appl. No.: 17/318,591

(22) Filed: May 12, 2021

(65) Prior Publication Data

US 2022/0364583 A1 Nov. 17, 2022

(51) Int. Cl.
F16B 5/06 (2006.01)
F16B 21/07 (2006.01)
F16J 15/02 (2006.01)

(52) U.S. Cl.
CPC ............ F16B 5/065 (2013.01); F16B 5/0657 (2013.01); F16B 21/075 (2013.01); *F16J 15/022* (2013.01)

(58) Field of Classification Search
CPC ...... F16B 5/065; F16B 5/0657; F16B 21/075; F16J 15/022
See application file for complete search history.

(56) References Cited

U.S. PATENT DOCUMENTS

| | | |
|---|---|---|
| 2,100,551 A | 11/1937 | Reiter |
| 2,607,971 A | 8/1952 | Bedford |
| 2,825,948 A | 3/1958 | Parkin |
| 3,525,129 A | 8/1970 | Holton |
| 3,673,643 A | 7/1972 | Kindell |
| 4,402,118 A | 9/1983 | Benedetti |
| 4,644,612 A | 2/1987 | Osterland |
| 4,683,622 A | 8/1987 | Oehlke |
| 4,865,505 A * | 9/1989 | Okada ................. B60R 13/0206 411/512 |
| 5,314,280 A | 5/1994 | Gagliardi et al. |

(Continued)

FOREIGN PATENT DOCUMENTS

| | | |
|---|---|---|
| BE | 632590 A | 10/1963 |
| CA | 496700 A | 10/1953 |
| EP | 0899466 A1 | 3/1999 |
| EP | 1482184 A2 | 12/2004 |
| EP | 1510702 A1 | 3/2005 |

(Continued)

OTHER PUBLICATIONS

Extended European Search Report dated Oct. 21, 2022, in corresponding European Application No. 22171548.5.

(Continued)

*Primary Examiner* — Jason W San
(74) *Attorney, Agent, or Firm* — Harness, Dickey & Pierce, P.L.C.

(57) ABSTRACT

A U-base clip component can include a pair of rib coupling barbs which can extend inwardly from two opposing clip side walls. A seal component can include two opposing aperture retention wings coupled to a central wall. A first and a second component annular seal can extend from opposite respective sides of the central wall. The U-base clip component and the seal component can define an interior rib receiving cavity between both the clip side walls and the aperture retention wings. A pair of rib coupling barbs can extend into the interior rib receiving cavity from the clip side walls and the two opposing aperture retention wings can extend exteriorly from the clip side walls. The rib coupling barbs of the U-base clip can be designed to couple fastener to the rib and the aperture retention wings can be designed to couple the dual component sealing fastener to the aperture.

29 Claims, 8 Drawing Sheets

(56) References Cited

U.S. PATENT DOCUMENTS

| | | | |
|---|---|---|---|
| 5,373,611 A | 12/1994 | Murata | |
| 5,422,789 A | 6/1995 | Fisher et al. | |
| 5,533,237 A * | 7/1996 | Higgins | F16B 21/075 24/297 |
| 5,542,158 A * | 8/1996 | Gronau | F16B 5/0657 24/297 |
| 5,647,713 A | 7/1997 | Ge et al. | |
| 5,774,949 A | 7/1998 | Cornell et al. | |
| 6,021,986 A | 2/2000 | Murdock | |
| 6,141,837 A | 11/2000 | Wisniewski | |
| 6,244,805 B1 | 6/2001 | Everard | |
| 6,279,207 B1 | 8/2001 | Vassiliou | |
| 6,353,981 B1 | 3/2002 | Smith | |
| 6,381,811 B2 | 5/2002 | Smith et al. | |
| 6,438,804 B1 * | 8/2002 | Romero Magarino | F16B 5/065 24/297 |
| 6,449,814 B1 | 9/2002 | Dinsmore et al. | |
| 6,454,507 B1 | 9/2002 | Romero Magarino | |
| 6,474,616 B2 | 11/2002 | Yamada et al. | |
| 6,497,011 B2 | 12/2002 | Smith et al. | |
| 6,527,471 B2 | 3/2003 | Smith et al. | |
| 6,629,809 B2 | 10/2003 | Vassiliou | |
| 6,648,542 B1 | 11/2003 | Smith et al. | |
| 6,665,914 B2 | 12/2003 | Ogawa | |
| 6,691,380 B2 | 2/2004 | Vassiliou | |
| 6,718,599 B2 | 4/2004 | Dickinson et al. | |
| 6,796,006 B2 | 9/2004 | Hansen | |
| 6,846,125 B2 | 1/2005 | Smith et al. | |
| 6,928,705 B2 | 8/2005 | Osterland et al. | |
| 6,976,292 B2 | 12/2005 | MacPherson et al. | |
| 7,051,408 B2 | 5/2006 | De Azevedo et al. | |
| 7,096,638 B2 | 8/2006 | Osterland et al. | |
| 7,120,971 B2 | 10/2006 | Osterland et al. | |
| 7,134,170 B2 | 11/2006 | Gibbons et al. | |
| 7,178,850 B2 | 2/2007 | Smith et al. | |
| 7,186,051 B2 | 3/2007 | Benedetti et al. | |
| 7,188,392 B2 | 3/2007 | Giugliano et al. | |
| 7,204,000 B2 | 4/2007 | Benedetti et al. | |
| 7,226,260 B2 | 6/2007 | Jackson, Jr. et al. | |
| 7,231,696 B2 | 6/2007 | Asano et al. | |
| 7,272,873 B2 | 9/2007 | Nessel et al. | |
| 7,287,945 B2 | 10/2007 | Lubera et al. | |
| 7,356,886 B2 | 4/2008 | Okada | |
| 7,364,382 B2 | 4/2008 | Benedetti et al. | |
| 7,374,200 B2 | 5/2008 | Ikeda et al. | |
| 7,399,151 B2 | 7/2008 | Lubera et al. | |
| 7,428,770 B2 | 9/2008 | Dickenson et al. | |
| 7,552,516 B2 | 6/2009 | Okada et al. | |
| 7,640,634 B2 | 1/2010 | Vassiliou | |
| 7,676,893 B2 | 3/2010 | Gibbons et al. | |
| 7,725,991 B2 | 6/2010 | Lubera et al. | |
| 7,740,432 B2 | 6/2010 | Harada | |
| 7,784,159 B2 | 8/2010 | Dickinson et al. | |
| 7,849,567 B2 | 12/2010 | Dickenson et al. | |
| 7,862,273 B2 | 1/2011 | Ooyama et al. | |
| 8,051,539 B2 | 11/2011 | Benedetti et al. | |
| 8,128,145 B2 | 3/2012 | Smith et al. | |
| 8,316,513 B2 | 11/2012 | DeJong et al. | |
| 8,370,999 B2 | 2/2013 | Camus | |
| 8,474,107 B2 | 7/2013 | Baumgartner et al. | |
| 8,528,295 B2 | 9/2013 | Glynn et al. | |
| 8,567,017 B2 | 10/2013 | Iwahara et al. | |
| 8,627,552 B2 | 1/2014 | Smith et al. | |
| 8,793,845 B2 | 8/2014 | Benedetti et al. | |
| 8,904,607 B2 | 12/2014 | Diez Herrera | |
| 8,950,042 B2 | 2/2015 | Smith et al. | |
| 8,950,043 B2 | 2/2015 | Hofmann et al. | |
| 9,003,616 B2 | 4/2015 | Choi | |
| 9,080,588 B2 | 7/2015 | Diez Herrera et al. | |
| 9,562,554 B2 | 2/2017 | Vidal et al. | |
| 9,630,572 B2 | 4/2017 | Iwahara et al. | |
| 9,649,993 B1 | 5/2017 | Dickinson et al. | |
| 9,873,388 B2 | 1/2018 | Meyers et al. | |
| 9,981,614 B2 | 5/2018 | Mingerink et al. | |
| 10,030,684 B2 | 7/2018 | Paquet | |
| 10,227,025 B2 * | 3/2019 | Tamai | B32B 3/08 |
| 10,288,098 B2 * | 5/2019 | Meyers | B60R 13/0206 |
| 10,336,265 B2 | 7/2019 | Dickinson et al. | |
| 10,590,968 B2 | 3/2020 | Benedetti | |
| 10,634,176 B2 | 4/2020 | Dickinson | |
| 10,670,058 B2 | 6/2020 | Sugiyama | |
| 10,766,435 B2 | 9/2020 | Diep et al. | |
| 10,894,516 B2 | 1/2021 | Benedetti et al. | |
| 10,968,931 B1 * | 4/2021 | Forti | F16B 2/22 |
| 2002/0001502 A1 * | 1/2002 | Smith | F16B 5/0614 403/194 |
| 2002/0010502 A1 | 1/2002 | Trachtenberg | |
| 2002/0017009 A1 | 2/2002 | Smith et al. | |
| 2002/0104201 A1 | 8/2002 | Smith et al. | |
| 2002/0194710 A1 | 12/2002 | Dickinson et al. | |
| 2004/0083582 A1 | 5/2004 | Dickinson et al. | |
| 2005/0105987 A1 | 5/2005 | Giugliano et al. | |
| 2005/0236861 A1 | 10/2005 | Slobodecki et al. | |
| 2005/0271492 A1 | 12/2005 | Jackson et al. | |
| 2006/0117536 A1 | 6/2006 | Smith | |
| 2006/0168773 A1 | 8/2006 | Smith et al. | |
| 2007/0189875 A1 | 8/2007 | Ooyama et al. | |
| 2008/0086850 A1 | 4/2008 | Smith et al. | |
| 2008/0098576 A1 | 5/2008 | Smith et al. | |
| 2008/0271297 A1 | 11/2008 | Dubost | |
| 2009/0205174 A1 | 8/2009 | Slobodecki et al. | |
| 2009/0293237 A1 | 12/2009 | Benedetti et al. | |
| 2010/0303539 A1 * | 12/2010 | Aoki | F16B 21/075 403/291 |
| 2011/0116890 A1 | 5/2011 | Okada et al. | |
| 2012/0311829 A1 | 12/2012 | Dickinson et al. | |
| 2013/0340216 A1 | 12/2013 | Smith et al. | |
| 2015/0076304 A1 | 3/2015 | Hattori | |
| 2015/0211565 A1 | 7/2015 | Benedetti | |
| 2015/0267734 A1 | 9/2015 | Boyer et al. | |
| 2015/0321622 A1 | 11/2015 | Dickinson et al. | |
| 2016/0068118 A1 | 3/2016 | Benedetti | |
| 2016/0214520 A1 | 7/2016 | Kajio | |
| 2016/0356298 A1 | 12/2016 | Pquet | |
| 2016/0375840 A1 | 12/2016 | Dickinson et al. | |
| 2017/0113629 A1 | 4/2017 | Dickinson et al. | |
| 2017/0113632 A1 | 4/2017 | Dickinson et al. | |
| 2017/0129421 A1 * | 5/2017 | Dickinson | F16B 21/075 |
| 2017/0291558 A1 | 10/2017 | Meyers et al. | |
| 2018/0339665 A1 | 11/2018 | Diep et al. | |
| 2019/0017527 A1 * | 1/2019 | Dickinson | F16B 21/075 |
| 2019/0048907 A1 * | 2/2019 | Sugiyama | F16B 21/075 |
| 2019/0048911 A1 | 2/2019 | Bidlake et al. | |
| 2019/0111857 A1 | 4/2019 | Benedetti et al. | |
| 2019/0170178 A1 | 6/2019 | Leverger et al. | |
| 2019/0195262 A1 | 6/2019 | Iwahara et al. | |
| 2019/0271339 A1 * | 9/2019 | Benedetti | F16B 5/126 |
| 2020/0208660 A1 | 7/2020 | Benedetti | |
| 2020/0340515 A1 | 10/2020 | Ulsamer et al. | |
| 2021/0095709 A1 | 4/2021 | Leverger et al. | |
| 2021/0102568 A1 * | 4/2021 | Malek | F16B 5/0657 |
| 2023/0082634 A1 * | 3/2023 | Riederer | B60R 13/0815 |

FOREIGN PATENT DOCUMENTS

| | | |
|---|---|---|
| EP | 2233386 A1 | 9/2010 |
| EP | 2139727 B1 | 12/2010 |
| EP | 3557086 A1 | 10/2019 |
| EP | 3800362 A1 | 4/2021 |
| EP | 3808998 A1 | 4/2021 |
| FR | 2976986 A1 | 12/2012 |
| FR | 3028577 B1 | 2/2018 |
| GB | 1171363 A | 11/1969 |
| GB | 2201723 A | 9/1988 |
| WO | WO-02/070905 A2 | 9/2002 |
| WO | WO-2012/104250 A1 | 8/2012 |
| WO | WO-2018/080610 A1 | 5/2018 |

OTHER PUBLICATIONS

Drawings of Stanley Engineered Fastening/Newfrey, Part # 71198-00, having a date of Oct. 23, 2013.

(56) References Cited

OTHER PUBLICATIONS

Drawings of Stanley Engineered Fastening/Newfrey, Part # 71819-00, having a date prior to Jan. 20, 2017.
Drawings of Stanley Engineered Fastening/Newfrey, Part# 71861-01, having a date of Jan. 20, 2017 (typically combined with an inner metal clip).
Drawings of Stanley Engineered Fastening/Newfrey, Part # 72350-00, having a date of Apr. 15, 2019.
Drawings of Stanley Engineered Fastening/Newfrey, Part # 71975-00, having a date prior to Apr. 15, 2019 (typically combined with an inner metal clip).
Drawings of Stanley Engineered Fastening/Newfrey, Part # X9081-C, having an unknown date.
Fastener Assembly drawing, Part #13772 (1989).
Fastener Assembly drawing, Part #14788 (1992).
Fastener Assembly drawing, Part #14789 (1992).
Extended European Search Report dated Feb. 22, 2019 in corresponding European Patent Application No. EP18193923.
International Search Report and Written Opinion dated Jun. 5, 2019 in corresponding International Application No. PCT/US2019/020321.
Extended European Search Report dated Oct. 28, 2019 in European Patent Application No. 19177827.3.
Extended European Search Report in corresponding European Patent Application No. 20200208.5 dated Feb. 24, 2021.

\* cited by examiner

DUAL COMPONENT SEALING FASTENER AND COUPLING ASSEMBLY INCLUDING SAME

FIELD

The present disclosure relates to dual component sealing fasteners designed to couple a first component having a rib to a second component having an aperture therethrough and coupling assemblies including same.

BACKGROUND

This section provides background information related to the present disclosure which is not necessarily prior art.

One type of sealing fastener designed to couple a first component having a rib to a second component having an aperture therethrough are referred to as bathtub fasteners. Such bathtub fasteners typically have a bathtub portion that seals around a specially-designed metal clip. The metal clip couples the rib to the interior of the bathtub. In turn, the bathtub is inserted into the aperture to seal the aperture and provide the coupling between the aperture and the metal clip. Among their disadvantages, such bathtub fasteners typically require a relatively large amount of space to implement, and have a relatively high cost to manufacture.

Another type of sealing fastener designed to couple a first component having a rib to a second component having an aperture therethrough are referred to as pour-over clips. Such pour-over clips typically have a liquid sealing material that is poured over the terminal end of the metal clip to form a planar seal element for sealing between the two components. Among their disadvantages, it is difficult to ensure the clip is centered so that an effective seal is formed against both the components, and pour-over material options are very limited.

SUMMARY

This section provides a general summary of the disclosure, and is not a comprehensive disclosure of its full scope or all of its features.

In accordance with one aspect of the present disclosure, a dual component sealing fastener designed to couple a first component having a rib to a second component having an aperture therethrough can include a U-base clip component and a seal component. The U-base clip component can include two opposing clip side walls joined together at a clip insertion end to form a U-shaped clip portion. A pair of rib coupling barbs can extend inwardly from the two opposing clip side walls. The seal component can include a central wall having a rib receiving aperture therethrough. Two opposing aperture retention wings can be joined together at a wing insertion end to form a U-shaped wing portion. Each of the two opposing aperture retention wings can have a wing trailing end, opposite the wing insertion end, that is coupled to the central wall. A first component annular seal can extend in a first direction away from a first side of the central wall. A second component annular seal can extend in a second direction away from a second side of the central wall opposite the first direction and opposite the first side, respectively. The U-base clip component and the seal component can have an assembled configuration in which the U-base clip component and the seal component can be coupled together to define an interior rib receiving cavity between both the two opposing clip side walls and the two opposing aperture retention wings, and in which the pair of rib coupling barbs can extend into the interior rib receiving cavity, and in which the two opposing aperture retention wings can extend exteriorly of the two opposing clip side walls. The pair of rib coupling barbs can be designed to engage the rib to couple the dual component sealing fastener to the rib in the assembled configuration with the rib received within the interior rib receiving cavity. The two opposing aperture retention wings can be designed to engage the aperture to couple the dual component sealing fastener to the aperture in the assembled configuration with the clip insertion end and the wing insertion end extending through the aperture.

In accordance with one aspect of the present disclosure, a dual component sealing fastener designed to couple a first component having a rib to a second component having an aperture therethrough can include a metal U-base clip component and a dual material seal component. The metal U-base clip component can include two opposing clip side walls joined together at a clip insertion end to form a U-shaped clip portion. Each of the opposing clip side walls can have a wall opening therethrough. A pair of rib coupling barbs can extend inwardly from the two opposing clip side walls. The dual material seal component can include a single piece plastic material part and a single piece seal material part. The single piece plastic material part can include a central wall that has a rib receiving aperture therethrough. Two opposing aperture retention wings can be joined together at an wing insertion end to form a U-shaped wing portion. Each of the two opposing aperture retention wings can have a wing trailing end, opposite a wing insertion end, coupled to the central wall. A pair of wing coupling arms can couple each wing trailing end to the central wall. The single piece seal material part can include a first component annular seal extending in a first direction away from a first side of the central wall. A second component annular seal can extend in a second direction away from a second side of the central wall opposite the first direction and opposite the first side, respectively. The metal U-base clip component and the dual material seal component can have an assembled configuration in which the metal U-base clip component and the dual material seal component are coupled together to define an interior rib receiving cavity between both the two opposing clip side walls and the two opposing aperture retention wings, and in which the wing insertion end is positioned interiorly of the clip insertion end, and in which the pair of rib coupling barbs extend interiorly into the interior rib receiving cavity, and in which the two opposing aperture retention wings extend exteriorly through the wall openings. The pair of rib coupling barbs can be designed to engage the rib to couple the dual component sealing fastener to the rib in the assembled configuration with the rib received within the interior rib receiving cavity. The two opposing aperture retention wings can be designed to engage the aperture to couple the dual component sealing fastener to the aperture in the assembled configuration with the clip insertion end and the wing insertion end extending through the aperture.

In accordance with another aspect of the present invention, a coupling assembly can include a first component that can have a coupling rib and a first component sealing surface surrounding the coupling rib. A second component can have a coupling aperture therethrough and a second component sealing surface surrounding the coupling aperture. A U-base clip component can include two opposing clip side walls joined together at a clip insertion end to form a U-shaped clip portion. A pair of rib coupling barbs can extend inwardly from the two opposing clip side walls. A seal component can include a central wall having a rib receiving aperture therethrough. Two opposing aperture retention wings can be joined together at a wing insertion end to form a U-shaped wing portion. Each of the two opposing aperture retention wings can have a wing trailing end, opposite the wing insertion end, coupled to the central wall. A first component annular seal can extend in a first direction away from a first side of the central wall. A second component annular seal extending in a second direction away from a second side of the central wall opposite the first direction and opposite the first side, respectively. The U-base clip component and the seal component can have an assembled configuration in which the U-base clip component and the seal component are coupled together to define an interior rib receiving cavity between both the two opposing clip side walls and the two opposing aperture retention wings, and in which the pair of rib coupling barbs extend into the interior rib receiving cavity, and in which the two opposing aperture retention wings extend exteriorly of the two opposing clip side walls. The pair of rib coupling barbs can engage the coupling rib to couple the U-base clip component to the first component in the assembled configuration with the coupling rib received within the interior rib receiving cavity. The two opposing aperture retention wings can engage the coupling aperture to couple the seal component to the second component in the assembled configuration with the clip insertion end and the wing insertion end extending through the coupling aperture.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Referring to FIGS. 1-13, one example dual component sealing fastener 20 designed to couple a first component 22 having a coupling rib 24 to a second component 26 having a coupling aperture 28 therethrough in a coupling assembly 18 in accordance with the present disclosure is described herein. The dual component sealing fastener 20 includes a U-base clip component 30 and a seal component 32.

The U-base clip component 30 includes two opposing side walls 34 joined together at an insertion end 36 with a rib receiving cavity 38 between the two opposing side walls 34. Each of the two opposing side walls 34 includes a wall trailing end 40 that is opposite the clip insertion end 36. As in the illustrated embodiment, the wing trailing end 40 of each of the two opposing side walls 34 need not have a flanged portion. Each of the opposing side walls 34 can have a wall opening 62 therethrough and through which a corresponding aperture retention wing 42 of the seal component 32 can extend outwardly from the side walls 34 as discussed below.

As in the illustrated embodiment, each wall opening 62 can have a keyhole shape, and can be formed by an opening insertion portion 86 combined with an opening trailing portion 88. The opening trailing portion 88 can have an opening trailing width 90 that is greater than an opening insertion width 92 of the opening insertion portion 86. Each aperture retention wing 42 can similarly have a wing insertion end portion that can correspond to the opening insertion portion 86 and a wing trailing end portion that can correspond to the opening trailing portion 88, and the wing trailing end portion can have a wing trailing width that can correspond to the opening trailing width 90 that is greater than a wing insertion width that can correspond to the opening insertion width 92 of the wing insertion end portion.

A pair of rib coupling arms 44 can extend inwardly from the two opposing side walls 34. Such rib coupling arms 44 are designed to couple the U-base clip component 30 to the first component 22 when the coupling rib 24 of the first component 22 is received within the rib receiving cavity 38 of the U-base clip component 30. The rib coupling arms can be barbs 44. As in the illustrated embodiment, multiple pairs of rib coupling arms or barbs 44 can be provided The U-base clip component 30 can be a metal component. For example, a single piece of sheet metal can fully comprise the U-base clip component 30.

The seal component 32 can include a central wall 46 having a rib receiving aperture 48 therethrough. The rib receiving aperture 48 can have multiple configurations and can accept multiple coupling rib 24 configurations. For example, the rib receiving aperture 48 can accept coupling ribs 24 with cross-rib locating ribs at each end, such as in the illustrated embodiment. Two opposing aperture retention wings 42 can be joined together at a wing insertion end 64 to form a U-shaped wing portion 66. Each of the two opposing aperture retention wings 42 can have a wing trailing end 68, opposite the wing insertion end 64. The aperture retention wings 42 are designed to couple the sealing fastener 20 to the second component 26 when the retention wings 42 are received within the coupling aperture 28 of the second component 26.

The wing trailing end 68 of each retention wing 42 can be coupled to the central wall 46. For example, one or more coupling arms 70 can couple each wing trailing end 68 to the central wall 46. Each wing coupling arm 70 can include a longitudinal pivot axis 72 that enables the wing coupling arm 70 and wing trailing end 68 to pivot upwardly in response to the two opposing aperture retention wings 42 moving toward each other. This upward pivoting can be designed to enable the trailing end 68 of the retention wings 42 to move upwardly as the retention wings 42 elongate in response to the aperture retention wings 42 moving toward each other during insertion through the coupling aperture 28.

Each coupling arm 70 can include an axial pivot axis 74 that enables the coupling arm 70 to pivot inwardly in response to the two opposing aperture retention wings 42 moving toward each other. This inward pivoting can be designed to enable the trailing end 68 of the retention wings 42 to move inwardly in response to the aperture retention wings 42 moving toward each other during insertion through the coupling aperture 28.

As in the illustrated example, a pair of wing coupling arms 70 can couple each wing trailing end 68 to the central wall 46. Each coupling arm 70 can have an inwardly extending portion 80 that can be adjacent the central wall 46. Each coupling arm 70 can have an axially extending portion 82 adjacent the aperture retention wing 42. Each coupling arm 70 can have a longitudinally extending portion 84 extending between the inwardly extending portion 80 and the axially extending portion 82. The inwardly extending portion 80 of the coupling arm 70 can have an end adjacent the central wall 46 and an end distal from the central wall 46. The end of the inwardly extending portion 80 of the wing coupling arm 70 that is distal from the central wall 46 can be positioned axially lower or downward from the end of the inwardly extending portion 80 of the wing coupling arm 70 that is adjacent or proximal the central wall 46. This can enable the coupling arm 70 to pivot upwardly in response to the two opposing aperture retention wings 42 to move toward each other during insertion of the retention insertion end through the aperture, without the coupling arms 70 or retention wings 42 moving above a distal end of the first component annular seal 50 or engaging the first component 22.

The longitudinal pivot axis 72 of the coupling arm 70 can be positioned at the end of the inwardly extending portion 80 of the coupling arm 70 that is adjacent or proximal the central wall 46. The axial pivot axis 74 of the coupling arm 70 can be at the end of the inwardly extending portion 80 of the coupling arm 70 that is distal from the central wall 46. The axial pivot axis 74 of the coupling arm 70 can be at the joining ends between the inwardly extending portion 80 and the longitudinally extending portion 84.

A single piece plastic material part 94 can fully comprise the central wall 46 and the two opposing aperture retention wings 42, including any wing coupling arms 70. All surfaces of the single piece plastic material part 94 can be oriented and positioned to enable molding of the single piece plastic material part 94 in a mold (not shown) without any slides. For example, all surfaces of the single piece molded plastic part 94 can be either: oriented and positioned to be visible in either a top plan view (FIG. 7) or a bottom plan view (FIG. 8); with any non-visible surface being oriented perpendicular to the top plan view and the bottom plan view and having an edge of the non-visible surface positioned to be visible in the top plan and in the bottom plan view.

A first component annular seal 50 can extend in a first direction away from a first side 52 of the central wall 46. Such a first component annular seal 50 is designed to seal against a surface of the first component 22 surrounding the coupling rib 24. A second component annular seal 54 can extend in a second direction away from a second side 56 of the central wall 46. The second direction and the second side 56 are opposite the first direction and opposite the first side 52, respectively. As in the illustrated embodiment, the central wall 46 can flat planar shape, and an outer or contacting lip or edge of the seals 50, 54 can terminate in a flat plane. Alternatively, the central wall 46, the contacting lip of the seals 50, 54, or both can have a somewhat curved shape so that the seals 50, 54 progressively engages the respective component sealing surfaces 76, 78. As another alternative, each of the seals 50, 54 can include multiple, e.g. two, outer or contacting lips or edges. Examples of alternatives to the oval shape of the seals 50, 54 can include circular and rectangular shapes.

A single piece of seal material part 60 can fully comprise the first component annular seal 50 and the second component annular seal 54. In other words, a single piece seal material part 60 can include both the first component annular seal 50 and the second component annular seal 54. An annular recess 58 can extend around the outside of the single piece seal material part 60 between the first component annular seal 50 and the second component annular seal 54. The seal component 32 can be fully formed of the single piece seal material part and the single piece plastic material part 94. The single piece seal material part 60 and the single piece plastic material part 94 can be bonded together. For example, single piece seal material part 60 and the single piece plastic material part 94 can be bonded together as a result of molding them together in a two-shot molding process.

Figure 1:
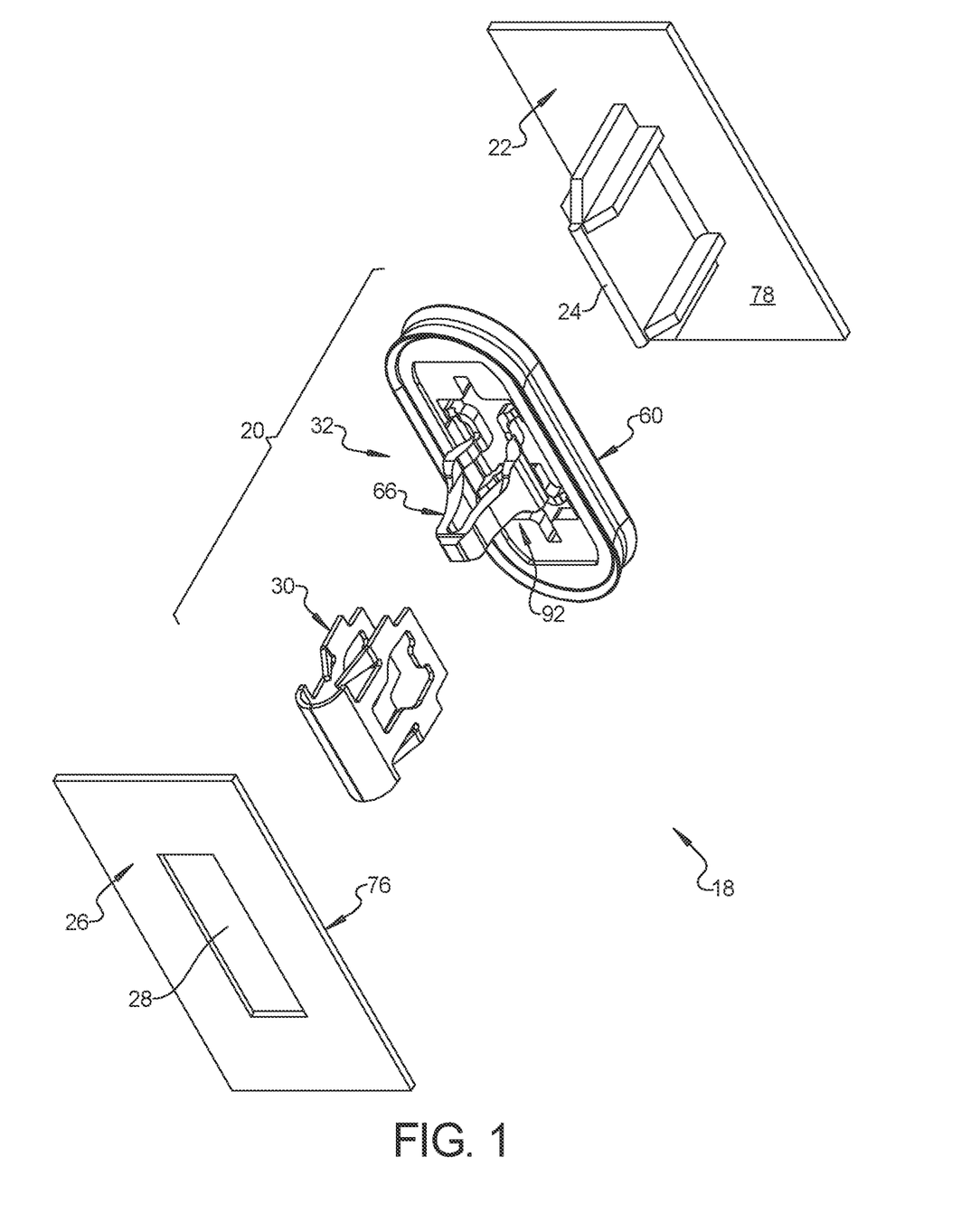
FIG. 1 is an exploded view of components of one example dual component sealing fastener, and of one example coupling assembly including a dual component sealing fastener, in accordance with the present disclosure.
Figure 2:
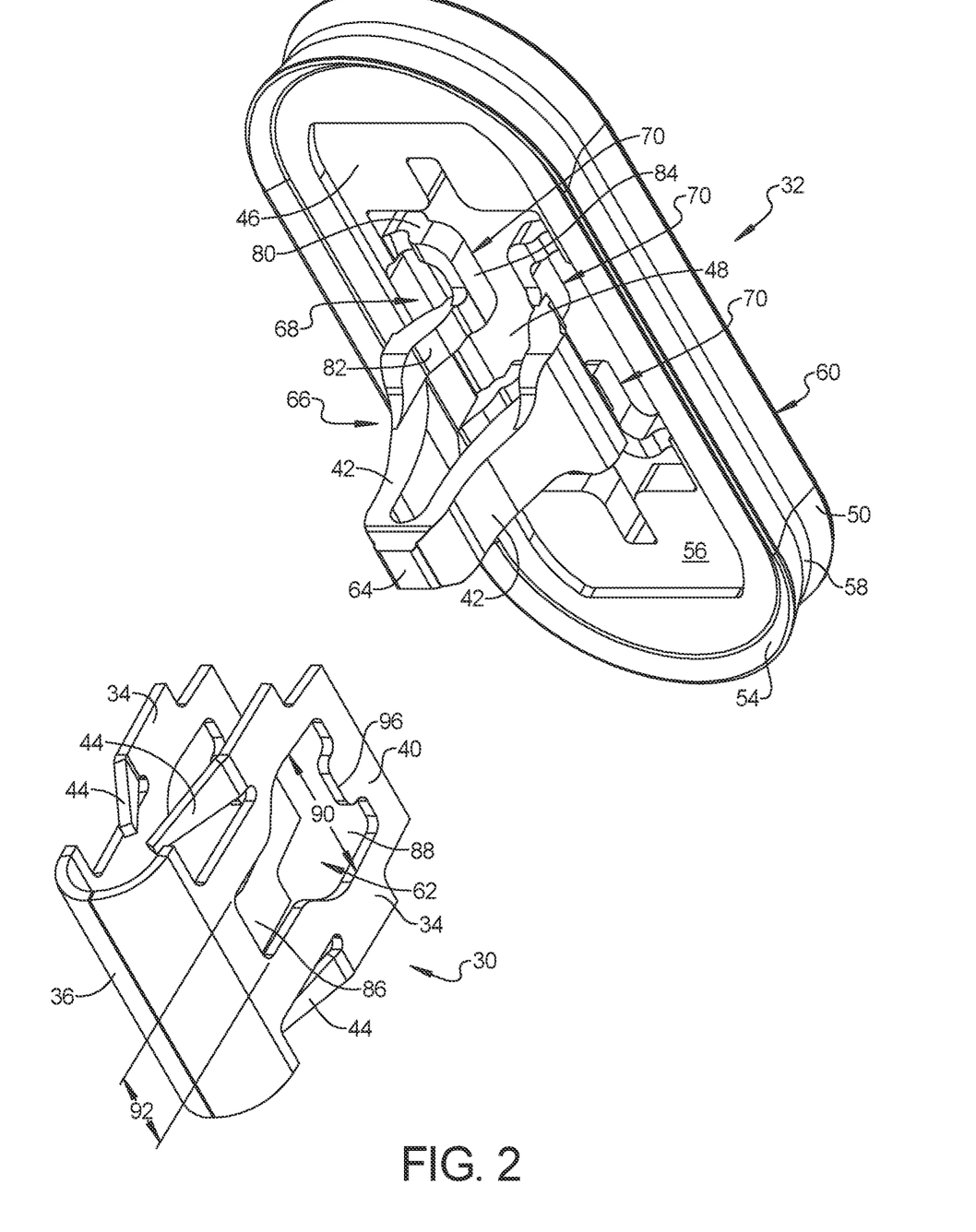
FIG. 2 is an exploded view of the dual component sealing fastener of FIG. 1.
Figure 3:
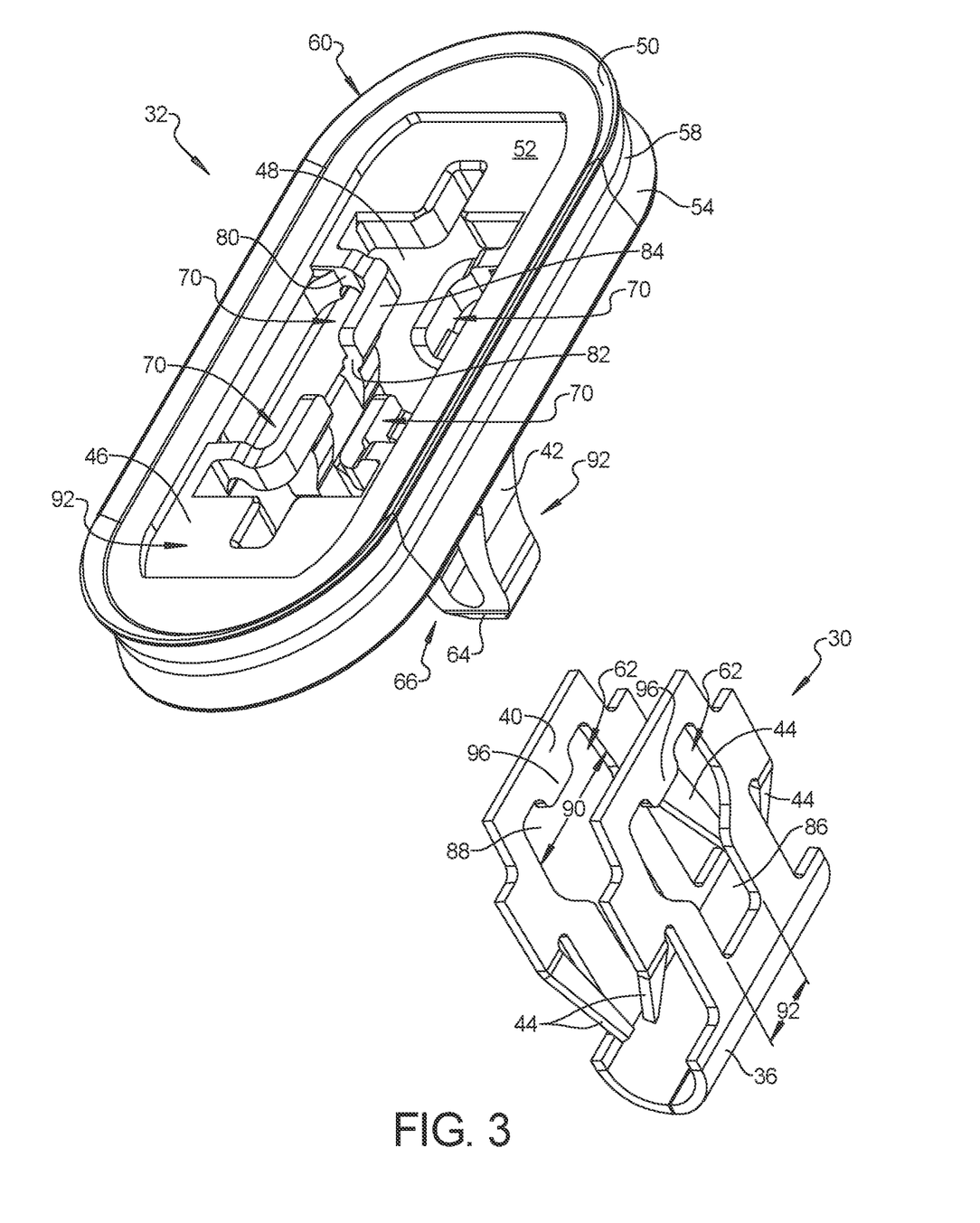
FIG. 3 is another exploded view of the dual component sealing fastener of FIG. 1.
Figure 4:
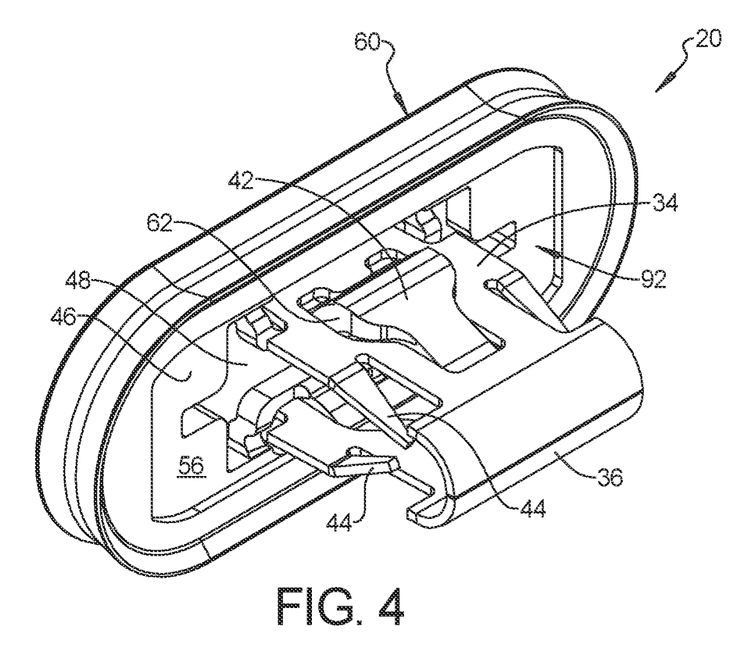
FIG. 4 is a perspective view of the dual component sealing fastener of FIG. 1 in an assembled configuration.
Figure 5:
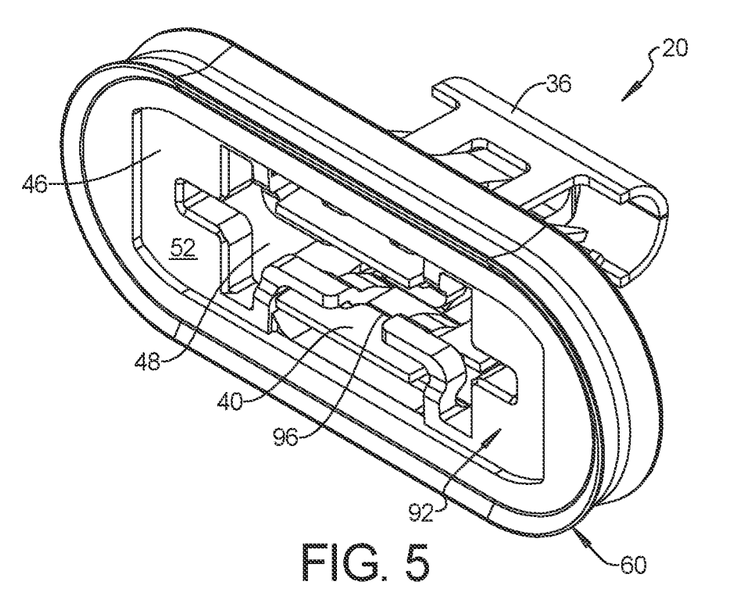
FIG. 5 is another perspective view of the dual component sealing fastener of FIG. 1 in an assembled configuration.
Figure 6:
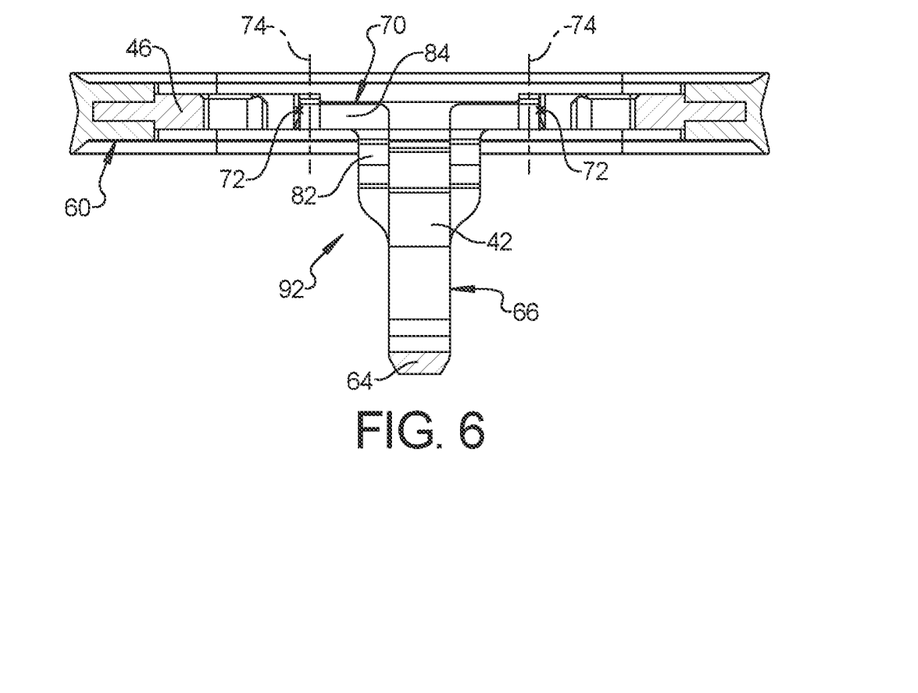
FIG. 6 is a cross-section view of the seal component of the dual component sealing fastener of FIG. 1 taken along line 6-6 of FIG. 7.

The seal component 32 and the U-base clip component 30 can be coupled together in an assembled configuration shown, e.g., in FIGS. 4 and 5. In this assembled configuration, the first side 52 is typically a side facing toward the trailing end 40 of the U-base clip component 30, away from the clip insertion end 36 of the U-base clip component 30, toward the first component 22, or away from the second component 26. Similarly, the first direction is typically a direction extending toward the trailing end 40 of the U-base clip component 30, away from the clip insertion end 36 of the U-base clip component 30, toward the first component 22, or away from the second component 26. Conversely, when assembled together, the second side 56 is typically a side facing toward the clip insertion end 36 of the U-base clip component 30, away from the trailing end 40 of the U-base clip component 30, toward the second component 26, or away from the first component 22. Similarly, the second direction is typically a direction extending toward the insertion end 36 of the U-base clip component 30, away from the trailing end 40 of the U-base clip component 30, toward the second component 26, or away from the first component 22.

In the assembled configuration of the dual component sealing fastener 20, the U-base clip component 30 and the seal component 32 can be coupled together to define an interior rib receiving cavity 38 between both the two opposing clip side walls 34 and the two opposing aperture retention wings 42. As in the illustrated example, the two opposing aperture retention wings 42 can operate to couple the U-base clip component 30 and the seal component 32 together, which can eliminate the need for additional coupling elements to accomplish to couple this assembly together. The wing insertion end 64 can be positioned interiorly of the clip insertion end 36, and the rib coupling arms of barbs 44 can extend interiorly into the interior rib receiving cavity 38. The two opposing aperture retention wings 42 can extend exteriorly through the wall openings 62 of the two opposing clip side walls 34.

A wall trailing end 40 of each side wall 34 of the U-base clip component 30 can be positioned between the inwardly extending portions 80 of a pair of coupling arms 70 that connect one of the aperture retention wings 42 to the central wall 46. This can facilitate proper centering and orientation of the U-base clip 30 and the seal component 32 during assembly and while assembled together. The trailing portion 88 of the wall opening 62 of the opposing clip side walls 34 can define a downwardly extending tab 96 that is positioned between the axially extending portions 82 of a pair of coupling arms 70 that connect one of the aperture retention wings 42 to the central wall 46. This can similarly facilitate proper centering and orientation of the U-base clip 30 and the seal component 32 during assembly and while assembled together. Each of the aperture retention wings 42 can include a groove or recessed portion (not shown) on its outer surface to corresponding the downwardly extending tab 96, which can similarly facilitate proper centering and orientation of the U-base clip 30 and the seal component 32 during assembly.

Figure 12:
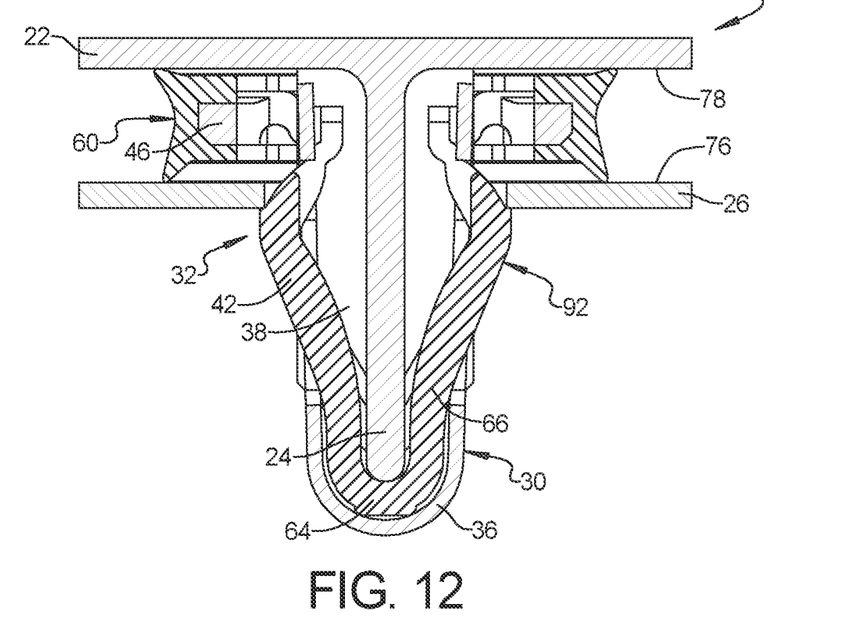
FIG. 12 is a cross-section view of the coupling assembly of FIG. 1, with the dual component sealing fastener in a coupling position coupling the first and second components together.
Figure 13:
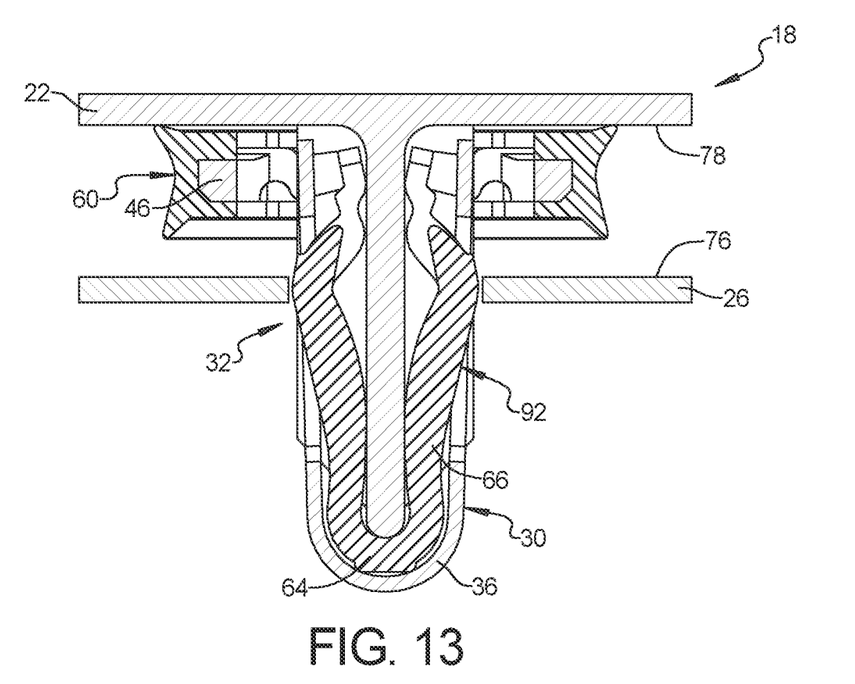
FIG. 13 is a cross-section view of the coupling assembly of FIG. 1, with the dual component sealing fastener with the aperture retention wings pushed or moving toward each other as they pass through the aperture.

The dual component sealing fastener 20 can be a sub-assembly or portion of a coupling assembly 18 having a coupling configuration in which the first component 22 is coupled to the second component 26 as shown in FIGS. 12 and 13. In this coupling configuration, the U-base clip component 30 can extend through the clip aperture 48 of the seal component 32 and through the coupling aperture 28 of the second component 26 with the aperture retention wings 42 retaining the second component annular seal 54 against a sealing surface 76 of the second component 26 surrounding the coupling aperture 28. The coupling rib 24 can extend into the rib receiving cavity 38 with the rib coupling arms 44 retaining the first component annular seal 50 against a sealing surface 78 of the first component 22 surrounding the coupling rib 24. As a result, the first component sealing surface 78 and the and second component sealing surface 76 can be sealed together around both the coupling aperture 28 of the second component 26 and the clip aperture 48 of the seal component 32.

The distal most exterior surface of the wing insertion end 64 and the distal most interior surface of the clip insertion end 63 can be positioned and designed to engage against each other to insure consistent compression of the seal 50 against the sealing surface 78. Similarly, the distal most end surface of the coupling rib 24 and the distal most interior surface of the wing insertion end 64 can be positioned and designed to engage against each other to insure consistent compression of the seal 54 against the sealing surface 76.

Figure 7:
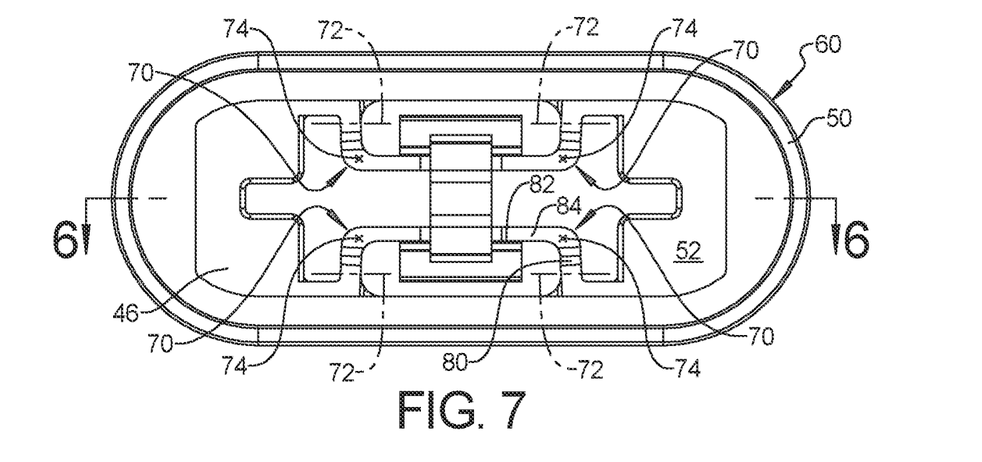
FIG. 7 is a top plan view of the seal component of the dual component sealing fastener of FIG. 1.
Figure 8:
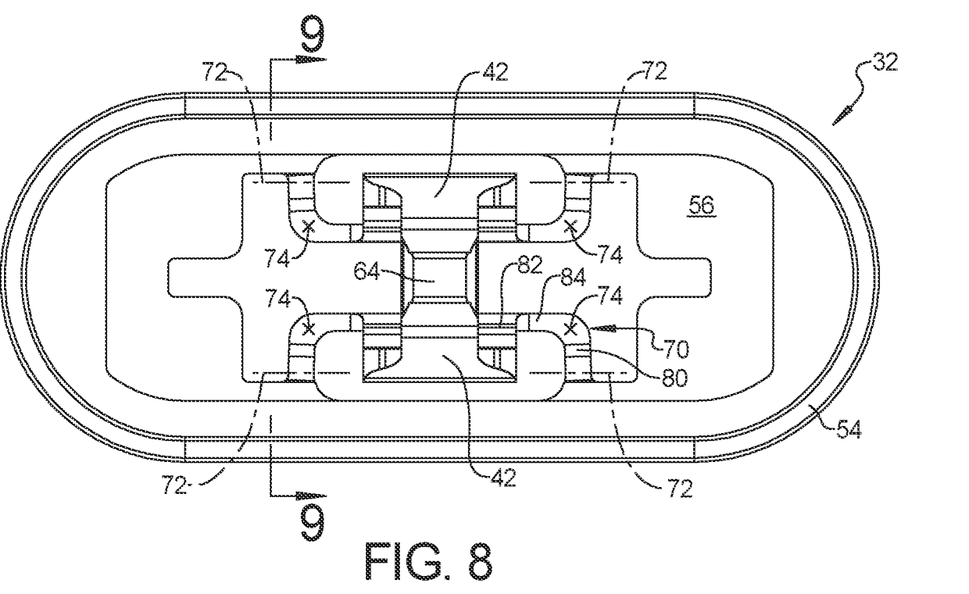
FIG. 8 is a bottom plan view of the seal component of the dual component sealing fastener of FIG. 1.
Figure 9:
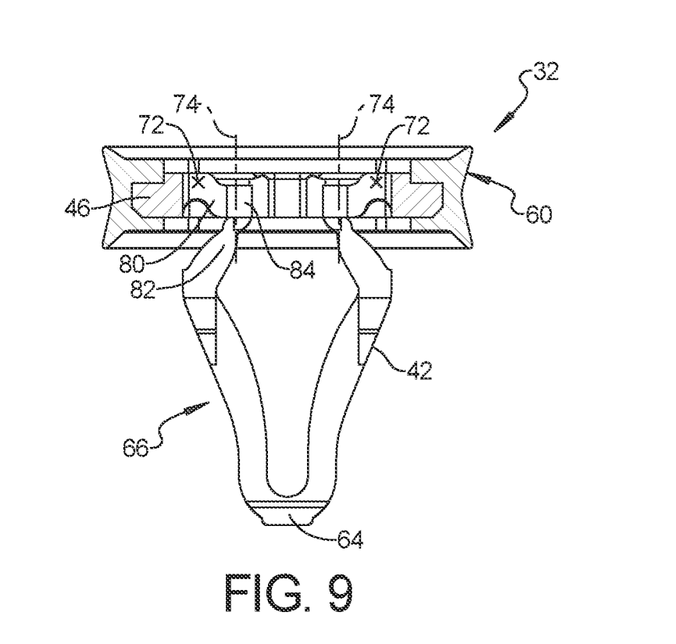
FIG. 9 is a cross-section view of the seal component of the dual component sealing fastener of FIG. 1 taken along line 9-9 of FIG. 8.
Figure 10:
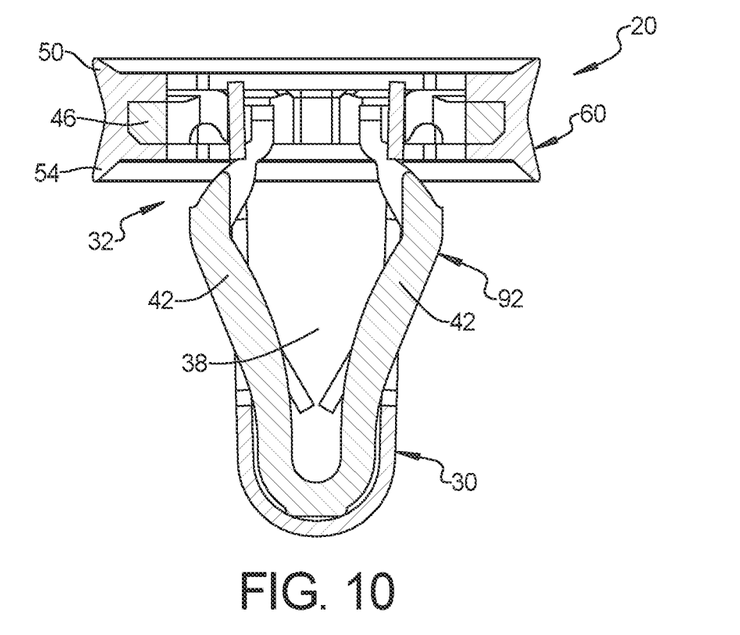
FIG. 10 is a cross-section view of the dual component sealing fastener of FIG. 1.
Figure 11:
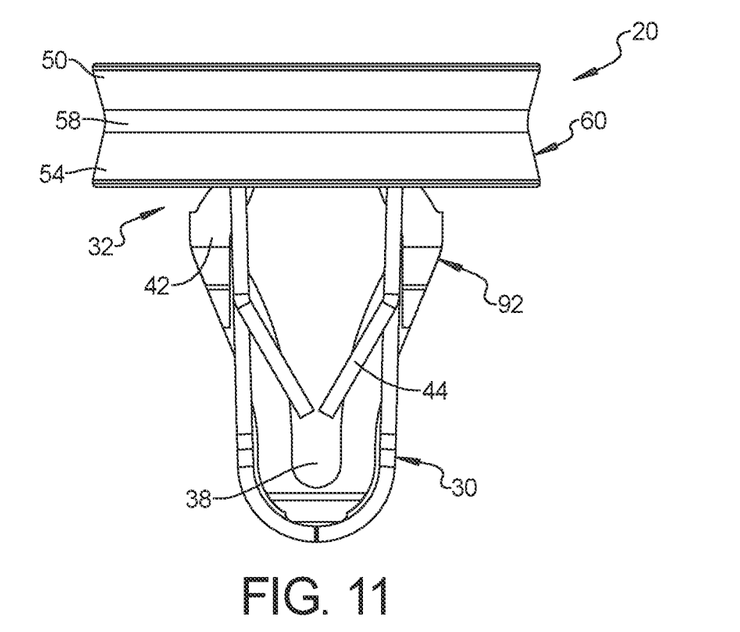
FIG. 11 is an end elevation view of the dual component sealing fastener of FIG. 1.

As used herein, the terms "longitudinal" and "longitudinally" refer to directions generally aligned with the longest overall dimension of the dual component fastener or seal component in a top plan view as shown in FIG. 7, or in a bottom plan view as shown in FIG. 8. This also corresponds to the X direction of an X, Y, Z coordinate system in these plan views. The terms "lateral" and "laterally" refer to directions generally aligned with the shortest overall dimension of the dual component fastener or seal component in a top plan view as shown in FIG. 7, or in a bottom plan view as shown in FIG. 8. This also corresponds to the Y direction of the X, Y, Z coordinate system in these plan views. The terms "axial" and "axially" corresponds to the Z direction of the X, Y, Z coordinate system in these plan views. The terms "upward" and "upwardly" are used in relation to the dual component fastener or its components being oriented as shown in FIGS. 6 and 9-13. The terms "downward" and "downwardly" are used in relation to the dual component fastener or its components being oriented as shown in FIGS. 6 and 9-13. Thus, upward, upwardly, downward, and downwardly, generally refer to Z directions of the X, Y, Z coordinate system. The terms "outward" and "outwardly" mean in a direction away from one of the aperture retention wings and toward the other aperture retention wings (which is along a Y direction of the X, Y, Z coordinate system). The terms "inward" and "inwardly" mean in a direction toward a center of the rib retention cavity. The terms "outward" and "outwardly" mean in a direction away from one of the aperture retention wings and also away from the other aperture retention wings, also along a Y direction of the X, Y, Z coordinate system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A dual component sealing fastener designed to couple a first component having a rib to a second component having an aperture therethrough, the dual component sealing fastener comprising:
    a U-base clip component comprising:
        two opposing clip side walls joined together at a clip insertion end to form a U-shaped clip portion; and
        a pair of rib coupling barbs extending inwardly from the two opposing clip side walls; and
    a seal component comprising:
        a central wall having a rib receiving aperture therethrough; and
        two opposing aperture retention wings joined together at a wing insertion end to form a U-shaped wing portion, and each of the two opposing aperture retention wings having a wing trailing end, opposite the wing insertion end, coupled to the central wall; and
        a first component annular seal extending in a first direction away from a first side of the central wall; and
        a second component annular seal extending in a second direction away from a second side of the central wall opposite the first direction and opposite the first side, respectively; and
    wherein the U-base clip component and the seal component have an assembled configuration in which the U-base clip component and the seal component are coupled together to define an interior rib receiving cavity between both the two opposing clip side walls and the two opposing aperture retention wings, and in which the pair of rib coupling barbs extend into the interior rib receiving cavity, and in which the two opposing aperture retention wings extend exteriorly of the two opposing clip side walls; and wherein the pair of rib coupling barbs are designed to engage the rib to couple the dual component sealing fastener to the rib in a coupled configuration with the rib received within the interior rib receiving cavity, and wherein the two opposing aperture retention wings are designed to engage the aperture to couple the dual component sealing fastener to the aperture in the coupled configuration with the clip insertion end and the wing insertion end extending through the aperture.

2. The dual component sealing fastener of claim 1, wherein a single piece molded plastic part comprises the central wall and the two opposing aperture retention wings.

3. The dual component sealing fastener of claim 2, wherein all surfaces of the single piece molded plastic part are oriented and positioned to enable molding of the single piece molded plastic part in a mold without any slides.

4. The dual component sealing fastener of claim 1, wherein a single piece sheet metal part comprises the U-base clip component.

5. The dual component sealing fastener of claim 1, wherein a single piece seal part comprises the first component annular seal and the second component annular seal.

6. The dual component sealing fastener of claim 5, wherein an annular recess extends around the outside of the single piece seal part between the first component annular seal and the second component annular seal.

7. The dual component sealing fastener of claim 1, wherein the wing insertion end is positioned interiorly of the clip insertion end in the assembled configuration.

8. The dual component sealing fastener of claim 1, wherein each of the two opposing clip side walls has a wall opening therethrough, and the two opposing aperture retention wings extend outwardly through the wall openings.

9. The dual component sealing fastener of claim 1, wherein an opening insertion end portion and an opening trailing end portion combine to form each wall opening and the opening trailing end portion has an opening trailing width that is greater than an opening insertion width of the opening insertion end portion.

10. The dual component sealing fastener of claim 1, wherein each of the two opposing aperture retention wings has a wing insertion end portion and a wing trailing end portion and the wing trailing end portion has a wing trailing width that is greater than a wing insertion width of the wing insertion end portion.

11. The dual component sealing fastener of claim 1, wherein a wing coupling arm couples each wing trailing end to the central wall.

12. The dual component sealing fastener of claim 11, wherein each wing coupling arm includes a longitudinal pivot axis that enables the wing coupling arm to pivot upwardly in response to the two opposing aperture retention wings moving toward each other during insertion of the wing insertion end through the aperture.

13. The dual component sealing fastener of claim 11, wherein each wing coupling arm includes an axial pivot axis that enables the wing coupling arm to pivot inwardly in response to the two opposing aperture retention wings moving toward each other during insertion of the wing insertion end through the aperture.

14. The dual component sealing fastener of claim 1, wherein a pair of wing coupling arms couples each wing trailing end to the central wall.

15. The dual component sealing fastener of claim 14, wherein each wing coupling arm has an inwardly extending portion and a wall trailing end of each of the two opposing clip side walls is positioned between the inwardly extending portions of one of the pairs of wing coupling arms in the assembled configuration.

16. The dual component sealing fastener of claim 14, wherein each wing coupling arm has an axially extending portion, and each of the two opposing clip side walls has a wall opening therethrough with a trailing portion of each wall opening defining a downwardly extending tab that is positioned between the axially extending portions of one of the pairs of wing coupling arms in the assembled configuration.

17. A dual component sealing fastener designed to couple a first component having a rib to a second component having an aperture therethrough, the dual component sealing fastener comprising:

a metal U-base clip component comprising:
two opposing clip side walls joined together at a clip insertion end to form a U-shaped clip portion, and each of the opposing clip side walls has a wall opening therethrough; and
a pair of rib coupling barbs extending inwardly from the two opposing clip side walls; and a dual material seal component comprising:
a single piece plastic material part including:
a central wall having a rib receiving aperture therethrough;
two opposing aperture retention wings joined together at a wing insertion end to form a U-shaped wing portion, and each of the two opposing aperture retention wings having a wing trailing end, opposite a wing insertion end, coupled to the central wall; and
a pair of wing coupling arms that couple each wing trailing end to the central wall; and a single piece seal material part including:
a first component annular seal extending in a first direction away from a first side of the central wall; and
a second component annular seal extending in a second direction away from a second side of the central wall opposite the first direction and opposite the first side, respectively; and wherein the metal U-base clip component and the dual material seal component have an assembled configuration in which the metal U-base clip component and the dual material seal component are coupled together to define an interior rib receiving cavity between both the two opposing clip side walls and the two opposing aperture retention wings, and in which the wing insertion end is positioned interiorly of the clip insertion end, and in which the pair of rib coupling barbs extend interiorly into the interior rib receiving cavity, and in which the two opposing aperture retention wings extend exteriorly through the wall openings; and wherein the pair of rib coupling barbs are designed to engage the rib to couple the dual component sealing fastener to the rib in a coupled configuration with the rib received within the interior rib receiving cavity, and wherein the two opposing aperture retention wings are designed to engage the aperture to couple the dual component sealing fastener to the aperture in the coupled configuration with the clip insertion end and the wing insertion end extending through the aperture.

18. The dual component sealing fastener of claim 17, wherein a formed metal sheet material comprises the metal U-base clip component.

19. The dual component sealing fastener of claim 17, wherein the single piece plastic material part comprises a single piece molded plastic part.

20. The dual component sealing fastener of claim 19, wherein all surfaces of the single piece molded plastic part are oriented and positioned to enable molding of the single piece molded plastic part in a mold without any slides.

21. The dual component sealing fastener of claim 20, wherein the single piece seal material part comprises a moldable seal material.

22. The dual component sealing fastener of claim 17, wherein each of the two opposing aperture retention wings has a wing insertion end portion and a wing trailing end portion and the wing trailing end portion has a wing trailing width that is greater than a wing insertion width of the wing insertion end portion.

23. The dual component sealing fastener of claim 17, wherein each wing coupling arm has an inwardly extending portion, a longitudinally extending portion, and an axially extending portion.

24. The dual component sealing fastener of claim 23, wherein the inwardly extending portion is adjacent the central wall, and the axially extending portion is adjacent one of the opposing aperture retention wings.

25. The dual component sealing fastener of claim 17, wherein an inwardly extending portion of each of the wing coupling arms includes a longitudinal pivot axis that enables the wing coupling arm to pivot upwardly in response to the two opposing aperture retention wings moving toward each other during insertion of the wing insertion end through the aperture.

26. The dual component sealing fastener of claim 17, wherein each wing coupling arm includes an axial pivot axis at a connection between an inwardly extending portion and a longitudinally extending portion thereof that enables the wing coupling arm to pivot inwardly in response to the two opposing aperture retention wings moving toward each other during insertion of the wing insertion end through the aperture.

27. The dual component sealing fastener of claim 17, wherein each wing coupling arm has an inwardly extending portion and a wall trailing end of each of the two opposing clip side walls is positioned between the inwardly extending portions of one of the pairs of wing coupling arms in the assembled configuration.

28. The dual component sealing fastener of claim 17, wherein each wing coupling arm has an axially extending portion, and a trailing portion of each wall opening defines a downwardly extending tab that is positioned between the axially extending portions of one of the pairs of wing coupling arms in the assembled configuration.

29. A coupling assembly comprising:
a first component having a coupling rib and a first component sealing surface surrounding the coupling rib;
a second component having a coupling aperture therethrough and a second component sealing surface surrounding the coupling aperture; and
a U-base clip component comprising:
two opposing clip side walls joined together at a clip insertion end to form a U-shaped clip portion; and
a pair of rib coupling barbs extending inwardly from the two opposing clip side walls; and
a seal component comprising:
a central wall having a rib receiving aperture therethrough; and
two opposing aperture retention wings joined together at a wing insertion end to form a U-shaped wing portion, and each of the two opposing aperture retention wings having a wing trailing end, opposite the wing insertion end, coupled to the central wall; and
a first component annular seal extending in a first direction away from a first side of the central wall; and
a second component annular seal extending in a second direction away from a second side of the central wall opposite the first direction and opposite the first side, respectively; and
wherein the U-base clip component and the seal component have an assembled configuration in which the U-base clip component and the seal component are coupled together to define an interior rib receiving cavity between both the two opposing clip side walls and the two opposing aperture retention wings, and in which the pair of rib coupling barbs extend into the interior rib receiving cavity, and in which the two opposing aperture retention wings extend exteriorly of the two opposing clip side walls; and
wherein the pair of rib coupling barbs engage the coupling rib to couple the U-base clip component to the first component in a coupled configuration with the coupling rib received within the interior rib receiving cavity, and wherein the two opposing aperture retention wings engage the coupling aperture to couple the seal component to the second component in the coupled configuration with the clip insertion end and the wing insertion end extending through the coupling aperture.

* * * * *